United States Patent [19]

Stoltman

[11] Patent Number: 4,676,273

[45] Date of Patent: Jun. 30, 1987

[54] ELECTRO-HYDRAULIC PRESSURE REGULATING VALVE

[75] Inventor: Donald D. Stoltman, Henrietta, N.Y.

[73] Assignee: General Motors Corporation, Detroit, Mich.

[21] Appl. No.: 916,370

[22] Filed: Oct. 7, 1986

[51] Int. Cl.$^4$ .......................................... F15B 13/043
[52] U.S. Cl. .................. 137/625.61; 137/454.5; 137/544; 137/625.64
[58] Field of Search ............. 137/544, 625.61, 625.64, 137/454.5

[56] References Cited

U.S. PATENT DOCUMENTS

| | | | |
|---|---|---|---|
| 3,245,424 | 4/1966 | Olsen | 137/625.64 X |
| 3,599,673 | 8/1971 | Lucien | 137/625.61 |
| 3,667,322 | 6/1972 | Noguchi et al. | 74/731 |
| 3,738,193 | 6/1973 | Sumiyoshi et al. | 74/731 |
| 3,777,480 | 12/1973 | Stoltman | 60/39.161 A |
| 3,814,537 | 6/1974 | Stoltman | 415/36 |
| 4,186,909 | 2/1980 | Patel | 137/544 X |
| 4,388,844 | 6/1983 | Arai et al. | 74/752 |
| 4,524,804 | 6/1985 | Goedecke et al. | 137/625.64 |
| 4,572,436 | 2/1986 | Stettner et al. | 251/129.16 X |
| 4,576,200 | 3/1986 | Janecke et al. | 137/625.64 X |
| 4,585,030 | 4/1986 | Fox | 137/625.64 |
| 4,590,968 | 5/1986 | Wolfges | 137/625.64 |

*Primary Examiner*—Gerald A. Michalsky
*Attorney, Agent, or Firm*—Saul Schwartz

[57] ABSTRACT

An electro-hydraulic pressure regulating valve including a tubular valve body, a partition in the valve body dividing the latter into a valve chamber and a solenoid chamber, a valve sleeve in the valve chamber with a piston slidable in the sleeve and defining a bias pressure chamber between the piston and the partition and a control pressure chamber on the opposite side of the piston, closed center regulating ports on the piston and the valve sleeve for regulating a supply pressure to a control pressure in the control pressure chamber, a bias pressure orifice between a supply pressure port and the bias pressure chamber, a fluid strainer between the supply pressure port and the bias pressure orifice, a relief orifice in the partition between the bias pressure chamber and a fluid sump, and a solenoid operated valve normally closing the relief orifice and operative when energized to open the relief orifice. The valve is suited for miniaturization and regulates control pressure as a function of bias pressure without exhausting significant quantities of supply pressure directly to the sump.

4 Claims, 5 Drawing Figures

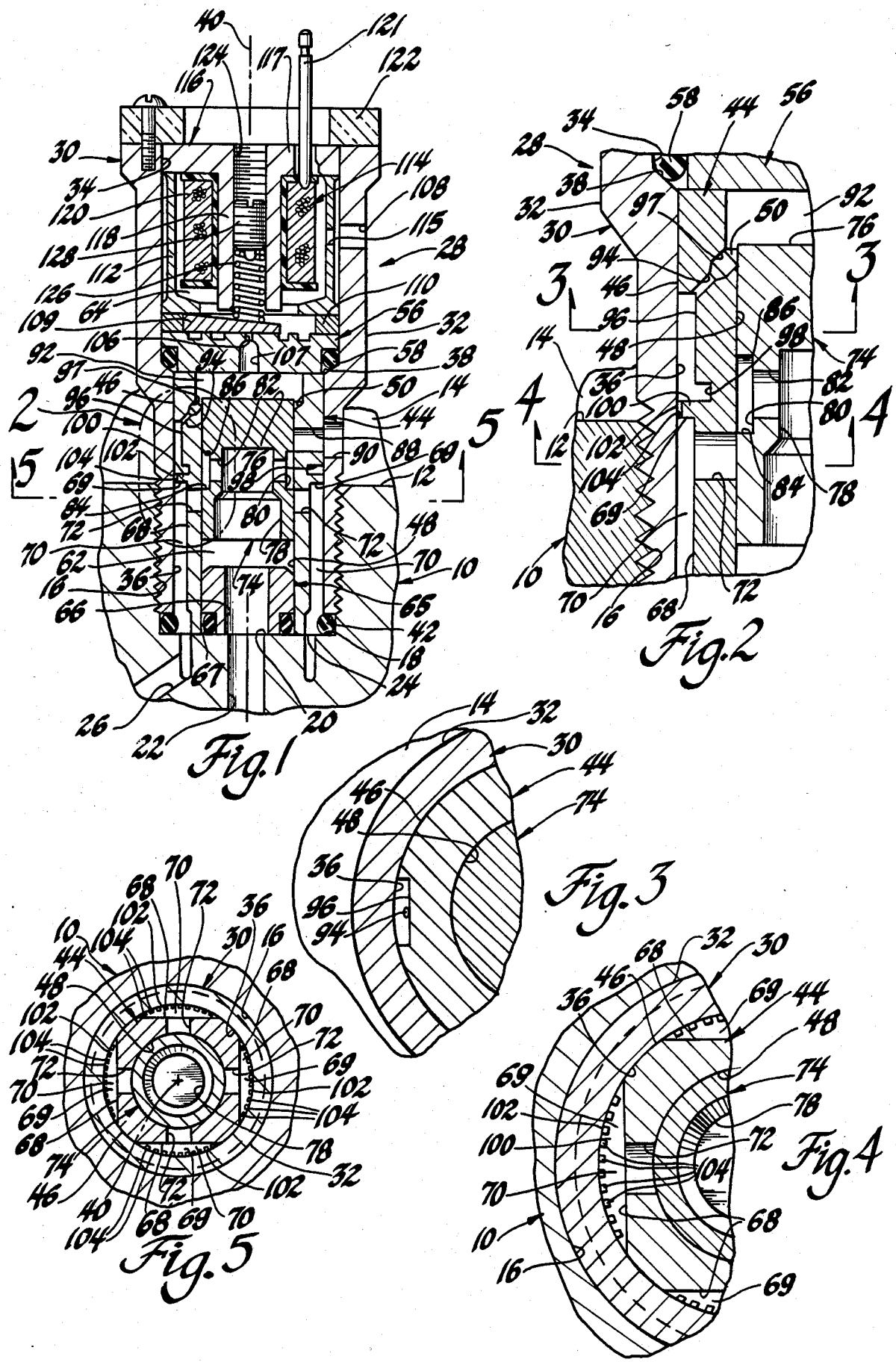

ELECTRO-HYDRAULIC PRESSURE REGULATING VALVE

BACKGROUND OF THE INVENTION

1. Field of the Invention

This invention relates to electro-hydraulic pressure regulating valves.

2. Description of the Prior Art

In mechanical, open-center pressure regulating valves, fluid at a high supply pressure is regulated to a control pressure by a spring biased valve spool which stabilizes in a regulating position wherein all of the supply pressure not consumed by the pressure actuated device or the control pressure circuit is exhausted to a low pressure fluid sump. Plural applications of such valves in the same system are complicated by the fact that each open-center valve consumes all of the supply pressure delivered to it. In open-center electro-hydraulic pressure regulating valves, the principle of operation is the same as in the mechanical valves but the valve spools are exposed to additional modulating pressure chambers into which fluid is introduced at varying modulating or bias pressures under the control of a solenoid valve. The modulating pressure acts either with or against the force of the regulating spring to change the regulated control pressure. In U.S. Pat. No. 3,777,480, issued Dec. 11, 1973 to Donald D. Stoltman and assigned to the assignee of this invention, a gas turbine fuel control is described including a closed-center slave valve which throttles fuel at a high supply pressure to a lower control or nozzle pressure at a rate determined by the magnitude of a bias pressure acting on the slave valve. The slave valve exhausts the nozzle pressure when the bias pressure is reduced to atmospheric pressure. An electro-hydraulic pressure regulating valve according to this invention regulates supply pressure to control pressure in closed-center fashion to conserve supply pressure and embodies a simple arrangement of structural elements particularly suited for miniaturization of the valve.

SUMMARY OF THE INVENTION

This invention is a new and improved pressure regulating valve. The new and improved valve includes a valve body mounted on a support, a valve sleeve in the valve body captured between an end wall of the support and a partition on the valve body which divides the interior of the latter into a solenoid chamber and a valve chamber, and a slave piston slidable in a bore in the valve sleeve. A bias pressure chamber is defined between the piston and the partition and a control pressure chamber is defined on the opposite side of the piston between the latter and the end wall of the support. Axially extending reliefs on an outside surface of the sleeve cooperate with the surrounding portion of the valve body in defining axial channels connected to a source of fluid at supply pressure and, through a bias pressure orifice, to the bias pressure chamber. Bias pressure in the bias pressure chamber moves the piston to a charging position wherein supply pressure from the axial channels is routed to the control pressure chamber and, from there, to a fluid pressure actuated device or circuit through a control pressure port in the support end wall. A relief orifice is defined in the partition and a solenoid controlled, hinged valve member is spring biased to a closed position closing the relief orifice. Bias pressure unseats the valve member to exhaust the bias pressure chamber through the solenoid chamber and, therefore, defines the maximum bias pressure up to the supply pressure. When the solenoid is energized, the valve member is moved to an open position against the spring to reduce the bias pressure in the bias pressure chamber so that control pressure in the control pressure chamber moves the piston to an exhausting position connecting the control pressure chamber to an exhaust. The duty cycle of the solenoid is varied to modulate the bias pressure and, therefore, the control pressure and a simple yet effective strainer is provided between the axial channels and the bias pressure orifice to trap contaminants ahead of the orifice.

BRIEF DESCRIPTION OF THE DRAWINGS

FIG. 1 is a longitudinal sectional view of an electro-hydraulic pressure regulating valve according to this invention;

FIG. 2 is an enlarged view of the portion of FIG. 1 within the circle identified as circle 2 in FIG. 1;

FIG. 3 is a sectional view taken generally along the plane indicated by lines 3—3 in FIG. 2;

FIG. 4 is a sectional view taken generally along the plane indicated by lines 4—4 in FIG. 2; and FIG. 5 is a sectional view taken generally along the plane indicated by lines 5—5 in FIG. 1.

DESCRIPTION OF THE PREFERRED EMBODIMENT

Referring now to FIG. 1 of the drawings, a fragmentarily illustrated support structure 10 has a side wall 12 defining a wall of a fluid reservoir or sump 14 maintained at substantially atmospheric pressure. An internally threaded bore 16 in the support structure extends from the side wall 12 to a bottom wall 18 at the bottom of the bore. A control pressure port 20 in the bottom wall 18 communicates with a fluid circuit or a fluid pressure actuated device, not shown, through a control pressure passage 22 in the support structure. An annular supply pressure port 24 in the bottom wall 18 is defined by an annular groove in the bottom wall and communicates with a source, not shown, of fluid at a supply pressure through a supply pressure passage 26 in the support structure. An electro-hydraulic pressure regulating valve 28 according to this invention, illustrated in highly magnified fashion for clarity, is disposed in the threaded bore 16.

The pressure regulating valve 28 includes a generally tubular valve body 30 having an outer cylindrical wall 32 threaded at one end and received in the threaded bore 16 of the support structure whereby the valve body is attached to the support structure. The valve body has a large diameter inner cylindrical wall 34 and a small diameter inner cylindrical wall 36 interconnected by a frustoconical shoulder 38 and aligned on a longitudinal axis 40 of the valve body. An outer seal ring 42 is disposed between the inboard end of the valve body 30 and the bottom wall 18 of the support structure to prevent escape of fluid across the threaded connection between the support structure 10 and the valve body.

A tubular valve sleeve 44 is press fitted within the small diameter inner wall 36 of the valve body and includes an outer cylindrical wall 46 having a diameter corresponding generally to the diameter of the small diameter inner wall 36. The valve sleeve 44 further includes an inner cylindrical wall or piston bore 48 aligned on the longitudinal axis 40. The diameter of the piston bore 48 expands slightly at one end of the valve sleeve by virtue of a shoulder 50 in the bore.

The sleeve 44 seats at one end against the bottom wall 18 and is captured at the other end by a circular partition 56 disposed in the large diameter inner wall 34 of the valve body 30. An appropriate seal ring 58 is disposed between the shoulder 38 of the valve body and an appropriate groove in the partition 56 whereby fluid leakage between the partition and the valve body is foreclosed. The partition divides the interior of the valve body into a valve chamber 62 between the partition and the bottom wall 18 in which the valve sleeve is disposed and a solenoid chamber 64 on the opposite side of the partition. A pilot 65 having a passage 66 therethrough is disposed in the piston bore 48 and seated against the bottom wall 18. The passage 66 registers with the control pressure port 20. An inner seal ring 67 is disposed between the valve sleeve 44 and the pilot 65 in an appropriate groove in the latter and forecloses direct fluid communication between the supply pressure port 24 and the control pressure port 20.

With particular reference to FIGS. 1, 4 and 5, the outer cylindrical wall 46 of the valve sleeve 44 is milled at four symmetrically spaced flat surfaces 68 which define reliefs on the outer wall 46 extending from the end of the sleeve adjacent the bottom wall 18 to respective ones of a corresponding plurality of end shoulders 69 on the valve sleeve. The flat surfaces 68 cooperate with the overlying portions of the small diameter inner wall 36 of the valve body 30 in defining a corresponding plurality of axial channels 70 open to and extending from the supply pressure port 24 to the end shoulders 69. A plurality of radial ports 72 through the valve sleeve intersect each of the axial channels 70 and the piston bore 48 whereby fluid at supply pressure is communicated to the piston bore.

As seen best in FIG. 1, a valve spool or slave piston 74 is slidably disposed in the valve bore 48 of the sleeve 44. The piston 74 has a circular bias pressure wall 76 at one end thereof, an internal cavity 78 opening through the opposite end of the piston, and a groove 80 in the outer wall of the piston which communicates with the internal cavity 78 through a plurality of radial ports 82. One edge of the groove 80 defines a first land 84 on the piston and the opposite edge of the groove defines a second land 86. In a charging position of the piston 74, not shown, the first land 84 overlaps the radial ports 72 in the valve sleeve thereby admitting fluid at supply pressure from the supply pressure port 24 to a control pressure chamber defined within the piston bore 48 below the piston 74 and to the control pressure port 20. In a discharging position of the piston 74 displaced upwardly from the charging position as viewed in FIG. 1, the second land 86 overlaps a plurality of the radial ports 88 in the valve sleeve 44 which, in turn, register with a corresponding plurality of ports 90 in the valve body 30 open to the sump 14. In the discharging position of the piston 74, the control pressure port 20 communicates with the sump 14. The width of the groove 80 in the piston 74 is coordinated with the axial spacing of the ports 72 and 88 in the valve sleeve 44 to assure closed-center operation of the piston, i.e. that the lands 84 and 86 do not simultaneously overlap the ports 72 and 88, respectively.

As seen best in FIGS. 1-4, a bias pressure chamber 92 is defined within the piston bore 48 between the bias pressure wall 76 of the piston and the adjacent wall of the partition 56. A bias pressure orifice 94 through the valve sleeve at the shoulder 50 thereof provides controlled fluid communication between the bias pressure chamber 92 and a generally rectangular notch 96 in the outer wall 46 of the valve sleeve. The bias pressure orifice 94 has an expanded diameter portion 97 opening into the bias pressure chamber. The notch 96 is covered by the small diameter inner wall 36 of the valve body 30 and is intersected by an annular groove 98 in the outer wall 46 of the valve sleeve. The groove 98 is spaced axially from each of the end shoulders 69 at the ends of the axial channels 70 so that a fluid dam 100, FIG. 2, is defined between each of the axial channels 70 and the annular groove 98. Each fluid dam has an arc shaped outer surface 102 juxtaposed the small diameter inner wall 36 of the valve body 30. A plurality of generally rectangular slots 104, FIGS. 2 and 4, in the outer surfaces 102 of the fluid dams intersect the end shoulders 69 and the annular groove 98 thereby providing fluid communication between each of the axial channels 70 and the notch 96 through the slots and the annular groove.

As seen best in FIG. 1, a relief orifice 106 with an expanded diameter portion 107 extends through the partition 56 providing communication between the bias pressure chamber 92 and the solenoid chamber 64. The solenoid chamber 64 communicates with the sump 14 through a radial bore 108 in the valve body 30. A hinged valve member 109 is disposed on the partition 56 within the solenoid chamber and encircled by a spacer ring 110. The valve member is pivotable about an edge thereof adjacent the ring 110 between a closed position, FIG. 1, closing the relief orifice 106 and an open position, not shown, exposing the relief orifice. The spacer ring 110 is captured between the partition 56 and a cup-shaped outer pole piece 112 of an electric solenoid 114 disposed in the solenoid chamber 64.

The outer pole piece has a radial bore 115 in register with the radial bore 108 in the valve body for permitting fluid flow from within the outer pole piece to the fluid sump. The solenoid 114 further includes an inner pole piece 116 having a disc-shaped end portion 117 in contact with the outer pole piece 112 and an integral tubular stem portion 118 aligned on the axis 40 and projecting toward the partition 56. A coil 120 of the solenoid is wound on a bobbin around the stem portion of the inner pole piece and is energized through a pair of pin terminals, only a single pin terminal 121 being shown in FIG. 1. A ring 122 fastened to the end of valve body 30 retains the inner pole piece 116, the outer pole piece 112, the spacer ring 110, and the partition 56 on the valve body. The structure and operation of a similar solenoid operated hinged valve is fully described in U.S. Pat. No. 4,572,436, issued to Ernest R. Stettner, Kenneth P. Cianfichi and Donald D. Stoltman on Feb. 25, 1986 and assigned to the assignee of this invention.

The stem portion 118 of the inner pole piece 116 has a bore 124 therethrough which is internally threaded over a portion of its length. A spring 126 is disposed in the bore 124 and bears at one end against the valve member 109 and at the other end against a plug 128 threaded into the bore 124. The spring biases the valve member to the closed position. The plug 128 is adjustable in the bore 124 for purposes of varying the preload on the valve member 109.

Commencing with the supply pressure passage 26 charged with fluid at a high supply pressure and the solenoid 114 deenergized, the electro-hydraulic pressure regulating valve 28 operates as follows. From the supply pressure port 24 the fluid at supply pressure migrates axially in each of the axial channels 70 to the radial ports 72 in the valve sleeve and to the end shoulders 69 defining the innermost extremities of the channels. The fluid is strained through the slots 104, each of which has a flow area less than the flow area of the bias pressure orifice 94, as it traverses the fluid dams 100 and enters the groove 98. The fluid traverses the groove 98 and the notch 96 and proceeds into the bias pressure chamber 92 through the bias pressure orifice 94. With the solenoid 114 deenergized, the spring 126 holds the valve member 109 in the closed position so that a bias pressure develops in the chamber 92 producing a resultant force on the bias pressure wall 76 of the piston 74 which increases as the bias pressure increases and moves the piston to the charging position. The bias pressure increases until it achieves a magnitude sufficient to overcome the force of spring 126 on the valve member 109 and thus unseats the valve member from the relief orifice 106 at which point the bias pressure stabilizes as a relatively small volume of fluid is continuously bled from the bias pressure chamber. If the bias pressure is not sufficient to overcome the spring force, the valve member 109 remains in the closed position and bias pressure stabilizes at a magnitude equal to supply pressure. Fluid leakage around the sleeve 44 is prevented by the press fit between the sleeve and the valve body 30.

The piston 74, in the charging position thereof, connects the control pressure port 20 to the supply pressure port 24 so that fluid accumulates in the control pressure chamber below the piston and in the control pressure passage 22 and the fluid pressure actuated device or circuit, now shown, connected thereto. A control pressure resultant force develops on the opposite side of the piston 74 from the bias pressure chamber 92 opposing the bias pressure resultant force on the piston. If the bias pressure in bias pressure chamber 92 is less than supply pressure, the control pressure resultant force will eventually begin to exceed the bias pressure resultant force whereupon the piston will begin movement from the charging position toward the discharging position. Without fluid loss in the control pressure circuit, the piston will achieve a null, closed-center position between the charging and discharging positions with the radial ports 72 and 88 simultaneously blocked by the piston. In this condition, the control pressure is maintained constant without significant flow of fluid at supply pressure directly to the sump 14. Because, in practice, varying amounts of leakage and/or fluid consumption occur in the control pressure circuit which decreases the control pressure as soon as the radial ports 72 are closed, the piston 74 stabilizes between the charging and discharging positions with just enough overlap between the first land 84 and the radial ports 72 to maintain control pressure constant. Here again, however, the consumption of fluid at supply pressure is just enough to match that lost or consumed by the circuit and does not require direct exhaust of fluid at supply pressure to the sump 14.

To decrease or modulate the control pressure, solenoid 114 is energized to pivot the valve member 109 from the closed to the open position. The bias pressure chamber 92 exhausts to the sump 14 through the relief orifice at a rate exceeding the flowrate of fluid into the bias pressure chamber through the bias pressure orifice 94 so that bias pressure and the resultant bias pressure force on the piston decrease. The opposing control pressure resultant force on the piston moves the latter to the discharging position wherein control pressure exhausts to the sump through the registered radial ports 88 and 90 in the valve sleeve and valve body, respectively. In order to achieve bias pressure magnitudes corresponding to control pressures approaching atmospheric pressure, the flow area of the relief orifice 106 may be on the order of about four times the flow area of the bias pressure orifice 94. By varying the duty cycle of the solenoid, the bias pressure is modulated between minimum and maximum magnitudes to likewise modulate the control pressure.

The electro-hydraulic pressure regulating valve 28 is suited for miniaturization. For example, a valve substantially corresponding to the preferred embodiment described herein has been designed with the following dimensions and performance characteristics.

supply pressure 100 PSIG control pressure range 8–99 PSIG bias pressure range 8–99 PSIG solenoid current drain when energized with 12 volts DC=less than 1 amp flow area-bias pressure orifice (reference character 94) $2.5 \times 10^{-4}$ IN$^2$ flow area-relief orifice (reference character 106) $3.7 \times 10^{-3}$ IN$^2$ flow area-individual strain slots (reference character 104) $3.6 \times 10^{-4}$ IN$^2$ diameter-slave piston 0.281 IN overall length-valve body (reference character 30) −1.675 IN central passage (reference character 22) minimum flow diameter=greater than 0.156 IN The embodiments of the invention in which an exclusive property or privilege is claimed are defined as follows:

1. An electro-hydraulic pressure regulating valve for disposition on a support structure comprising:

a tubular valve body disposed on said support structure with an end wall of said support structure closing an end of said valve body, a partition on said valve body dividing said valve body into a valve chamber between said partition and said end wall and a solenoid chamber on the opposite side of said partition from said valve chamber, means on said valve body connecting said solenoid chamber to a fluid sump, a tubular valve sleeve in said valve chamber captured between said end wall and said partition, a piston slidably disposed in said tubular valve sleeve for movement between a charging position and a discharging position and defining in said valve sleeve a bias pressure chamber between said piston and said partition and a control pressure chamber between said piston and said end wall, means on said support defining a control pressure port in said end wall connected to said control pressure chamber, means on said support defining an annular supply pressure port connected to a source of fluid at a supply pressure, closed-center fluid porting means on said valve sleeve and on said piston operative in said charging position of said piston to connect said supply pressure port to said control pressure chamber and in said discharging position of said piston to connect said control pressure chamber to said fluid sump and in a null position of said piston between said charging and said discharging positions to isolate said control pressure chamber from each of said supply pressure port and said sump, means defining a bias pressure orifice on said valve sleeve between said supply pressure port and said bias pressure chamber having a first flow area whereby fluid is admitted to said bias pressure chamber at a controlled flow rate thereby to create a bias pressure in said bias pressure chamber urging said piston to said charging position, means defining a fluid strainer between said supply pressure port and said bias pressure orifice operative to trap contaminant particles larger than said bias pressure orifice, means defining a relief orifice on said partition between said bias pressure chamber and said solenoid chamber having a second flow area larger than said first flow area, and an electric solenoid controlled valve means in said solenoid chamber operative in a deenergized condition to close said relief orifice and in an energized condition to open said relief orifice so that said bias pressure orifice drains to said fluid sump and said bias pressure is reduced to a magnitude permitting control pressure in said control pressure chamber to move said piston to said discharging position.

2. An electro-hydraulic pressure regulating valve for disposition on a support structure comprising:

a tubular valve body disposed on said support structure with an end wall of said support structure closing an end of said valve body, a partition on said valve body dividing said valve body into a valve chamber between said partition and said end wall and a solenoid chamber on the opposite side of said partition from said valve chamber, means on said valve body connecting said solenoid chamber to a fluid sump, a tubular valve sleeve in said valve chamber captured between said end wall and said partition and including a cylindrical inside wall, a piston slidably disposed in said valve sleeve inside wall for movement between a charging position and a discharging position and defining in said valve sleeve a bias pressure chamber between said piston and said partition and a control pressure chamber between said piston and said end wall, means on said support defining a control pressure port in said end wall connected to said control pressure chamber, means on said support defining an annular supply pressure port connected to a source of fluid at a supply pressure, means defining a plurality of axially extending reliefs on an outside wall of said valve sleeve extending from an end thereof adjacent said end wall to respective ones of a plurality of end shoulders and cooperating with said valve body in defining a plurality of axial channels therebetween, each of said axial channels being open to said annular supply pressure port and being filled with fluid at said supply pressure, means defining a plurality of inlet ports in said valve sleeve between each of said axial channels and said valve sleeve inside wall for communicating fluid at said supply pressure to said valve sleeve inside wall, means defining a plurality of exhaust ports in said valve sleeve between said inside wall of said valve sleeve and said fluid sump, closed-center regulating land means on said piston operative in said charging position of said piston to connect said inlet ports to said control pressure chamber and in said discharging position of said piston to connect said control pressure chamber to said exhaust ports and in a null position of said piston between said charging and said discharging positions to isolate said control pressure chamber from each of said inlet and said exhaust ports, means defining a bias pressure orifice on said valve sleeve connected to said bias pressure chamber and to each of said axial channels having a first flow area whereby fluid is admitted to said bias pressure chamber at a controlled flow rate thereby to create a bias pressure in said bias pressure chamber urging said piston to said charging position, means defining a fluid strainer between each of said axial channels and said bias pressure orifice operative to trap contaminant particles larger than said first flow area of said bias pressure orifice, means defining a relief orifice on said partition between said bias pressure chamber and said solenoid chamber having a second flow area larger than said first flow area, and an electric solenoid controlled valve means in said solenoid chamber operative in a deenergized condition to close said relief orifice and in an energized condition to open said relief orifice so that said bias pressure orifice drains to said fluid sump and said bias pressure is reduced to a magnitude permitting control pressure in said control pressure chamber to move said piston to said discharging position.

3. The electro-hydraulic pressure regulating valve recited in claim 2 wherein said means defining said fluid strainer includes means defining an annular groove in an outside wall of said valve sleeve covered by said valve body inside wall and connected to said bias pressure orifice and axially spaced from each of said end shoulders so that the portion of said valve sleeve between each of said end shoulders and said annular groove defines a plurality of fluid dams between each of said axial channels and said annular groove, and means defining a plurality of strainer passages through each of said fluid dams smaller than said first flow area of said bias pressure orifice.

4. The electro-hydraulic pressure regulating valve recited in claim 3 wherein said means defining said plurality of strainer passages includes a plurality slots in the portions of said outside wall of said valve sleeve between each of said end shoulders and said annular groove.

* * * * *